June 13, 1950     C. P. YOUNG     2,511,140
BEVELED WALL HOOK
Filed Oct. 24, 1944     2 Sheets-Sheet 1
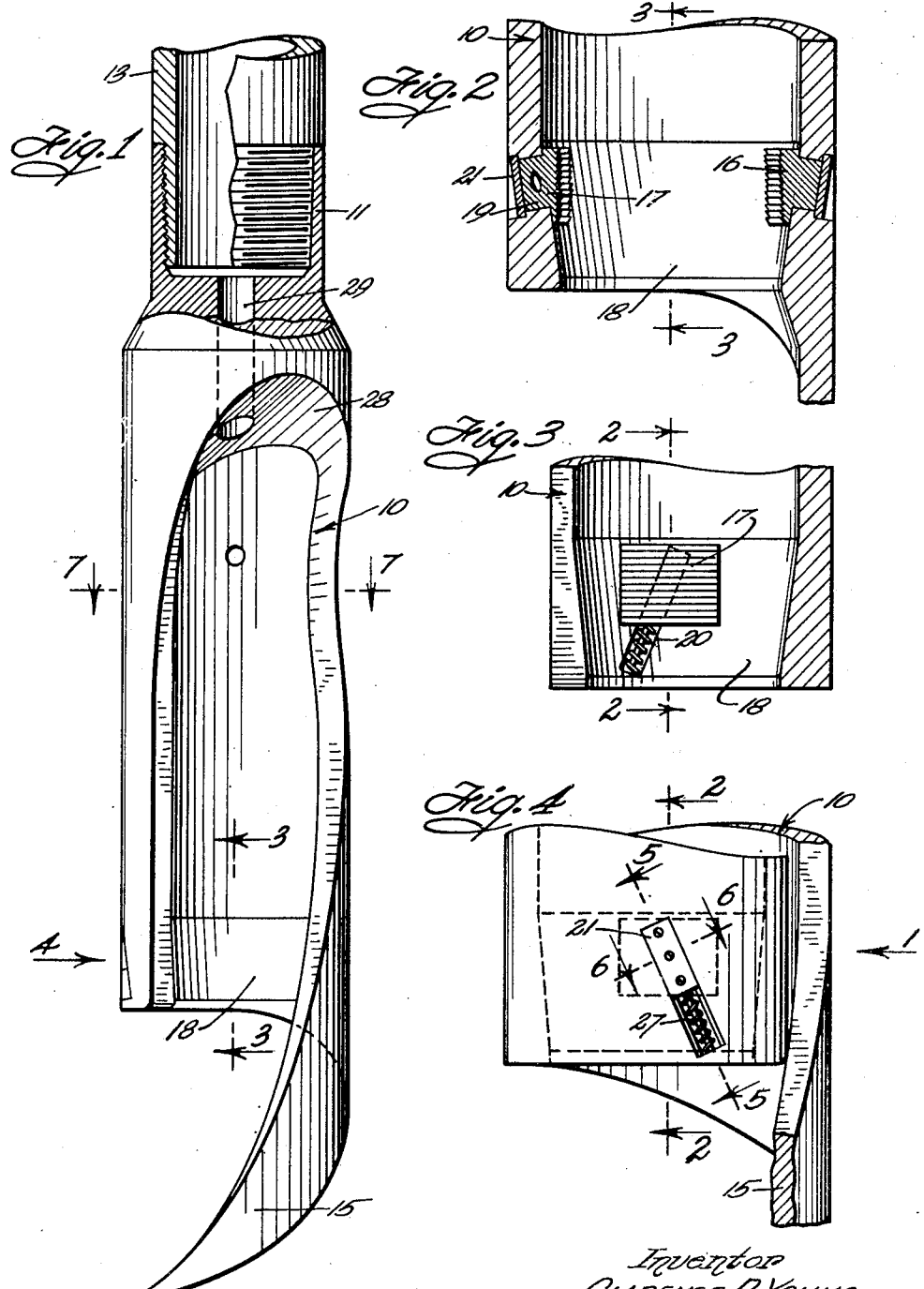

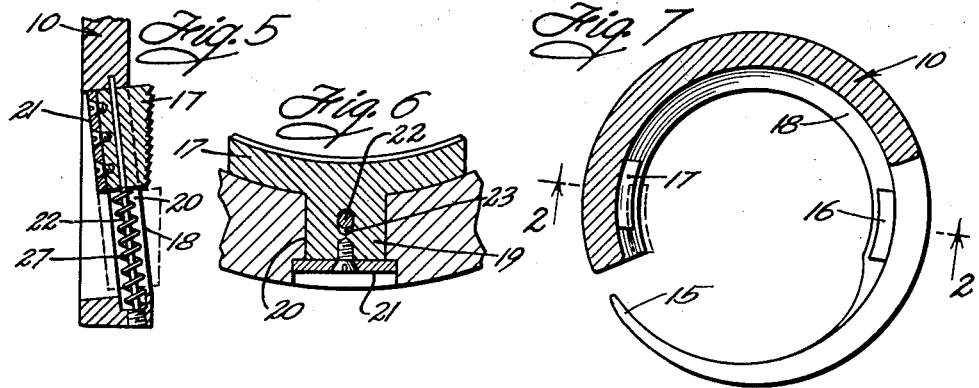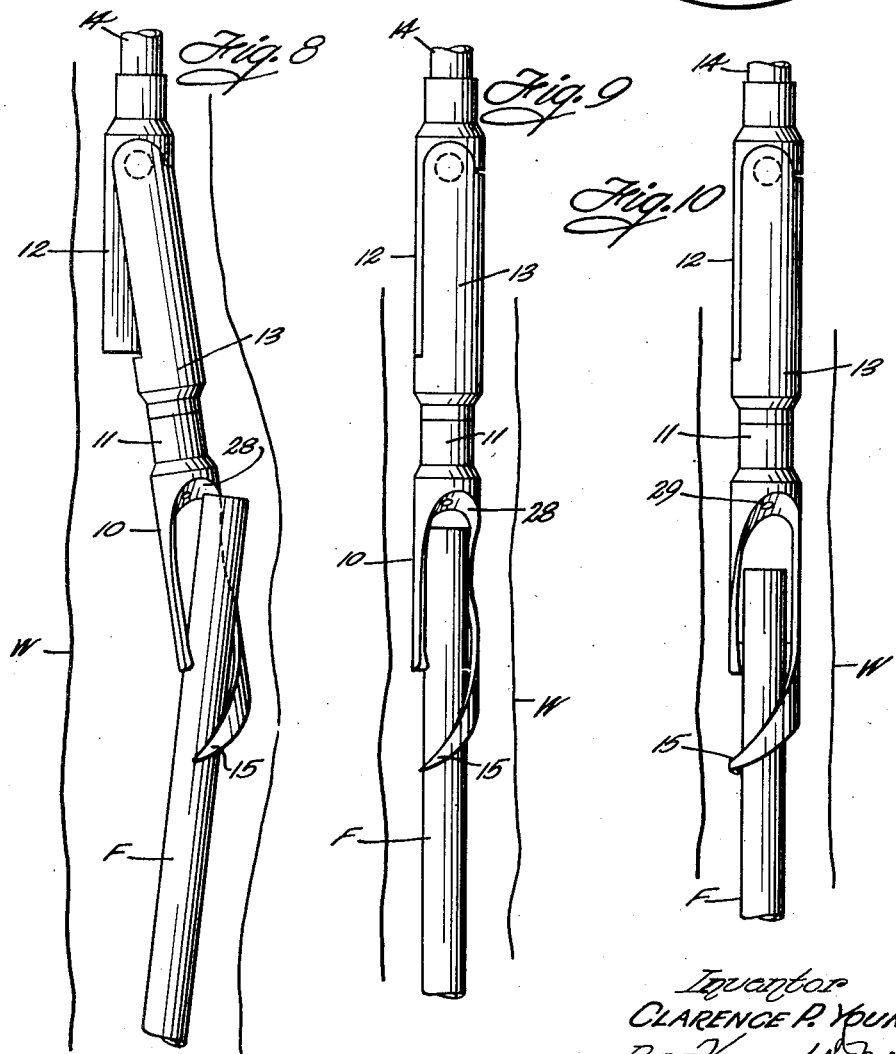

Patented June 13, 1950

2,511,140

UNITED STATES PATENT OFFICE 2,511,140

BEVELED WALL HOOK

Clarence P. Young, Bellflower, Calif.

Application October 24, 1944, Serial No. 560,168

8 Claims. (Cl. 294—86)

This invention relates to a beveled wall hook for use in recovering lost fish from wells, such as lost strings of drill pipe.

An object of the invention is to provide an improved wall hook consisting generally of a semi-cylindrical body having a finger extending helically downward from one side thereof and which has a slip means within the body so arranged as to contract upon the fish that has been engaged by the finger and brought within the body so that it may be elevated thereby.

More specifically, an object of the invention is to provide a wall hook having the above-mentioned characteristics wherein the slip means is so arranged as to effectively close the entrance to the body to prevent the escape of the fish therefrom.

Another object of the invention is to provide a wall hook wherein there is a semi-cylindrical body with a finger attached thereto and a slip means contractible upon the fish brought into the body and which is so constructed that an intentional release of the wall hook from the fish can be accomplished in the event that the fish has become immovably lodged in the well and it is desired to recover the wall hook.

With the foregoing and other objects in view which will be made manifest in the following detailed description and specifically pointed out in the appended claims, reference is had to the accompanying drawings for an illustrative embodiment of the invention, wherein:

Figure 1 is a front view in elevation of the improved wall hook;

Fig. 2 is a partial view in diametrical section through a portion of the wall hook illustrated in Fig. 1, and may be regarded as a view taken substantially upon the lines 2—2 on Figs. 3 and 4;

Fig. 3 is a diametrical section taken substantially upon the line 3—3 upon Fig. 2;

Fig. 4 is a partial view in side elevation taken substantially in the direction of the arrow 4 upon Fig. 1;

Fig. 5 is a sectional view taken substantially upon the line 5—5 upon Fig. 4;

Fig. 6 is a sectional view taken substantially upon the line 6—6 upon Fig. 4;

Fig. 7 is a horizontal section taken substantially upon the line 7—7 upon Fig. 1; and Figs. 8, 9, and 10 are views in elevation illustrating the manner in which the wall hook embodying the present invention may be used.

Referring to the accompanying drawings wherein similar reference characters designate similar parts throughout, the improved wall hook consists of a generally semi-cylindrical body 10 threaded at its upper end 11 for attachment to a run-in string of pipe, or preferably the arm of a hydraulic knuckle, such as that disclosed in my copending application Serial No. 560,167 filed Oct. 24, 1944, now abandoned.

Such a hydraulic knuckle is generally indicated at 12 on Figs. 8, 9, and 10, wherein the arm 13 is adapted to be hydraulically swung laterally with relation to a run-in string of pipe indicated at 14 so that the wall hook may be caused to swing adjacent the walls of the well W to engage a fish F such as a lost string of drill pipe.

On one side of the semi-cylindrical body there is formed a finger 15 which extends helically downward from this side of the body below the open side or entrance thereto. This finger may be regarded as that portion of the body which projects or extends beyond the semi-cylindrical portion in a circumferential direction and which extends below the bottom of the semi-cylindrical portion. On the inner face of this finger there is mounted a slip 16 having upwardly directed teeth. Diametrically opposite this slip 16 there is a movable slip 17 which is also equipped with upwardly directed teeth. The movable slip 17 bears at its back against downwardly and inwardly inclined wall surfaces 18 formed on the interior of the body adjacent the bottom thereof. This slip has a rib 19 arranged centrally of the back thereof which is slidable in a downwardly and forwardly inclined slot 20 formed in the body. A plate 21 is secured to the back of this rib and permits of such sliding movement in the slot and retains the slip in assembled relationship with the body. A guide pin 22 extends upwardly through the slot and through an elongated opening 23, see Fig. 6, that is formed in the rib. 27 indicates a coil compression spring disposed about the guide pin and which is adapted to be compressed between the bottom of the rib 19 and the bottom of the slot. This compression spring serves to urge the slip into its uppermost position but permits the slip to be forced downwardly within the slot as indicated by dotted lines on Figs. 5 and 7. Downward movement of the slip is limited by the rib on the slip engaging the bottom of the slot. It will be noted that during such movement the slip moves downwardly and inwardly so as to cooperate with slip 16 in contracting upon the fish F. At the same time, as will be observed from Fig. 7, the slip moves downwardly and forwardly so that instead of remaining in a position diametrically opposite slip 16 it moves forwardly so as to effectively close the entrance to the body to less than a semi-circle. Consequently, as the slip moves downwardly and inwardly and also forwardly escape of the fish F from within the semi-cylindrical body is effectively prevented.

At the top of the body there is formed an inclined surface 28, this surface being inclined from the back wall of the body forwardly and upwardly over finger 15. 29 is a circulation port in the top of the body through which circulation fluid may be discharged.

The operation and advantages of the improved wall hook are as follows: Frequently cavities occur in the well walls of a well that is being drilled, as illustrated in Fig. 8, and in the event that the drill pipe is twisted off or a string of drill pipe has become lost in the hole it leans into these cavities as illustrated in Fig. 8. The improved wall hook may be mounted on the arm 13 of a hydraulic knuckle and run into the well by means of the run-in string 14. On the application of pressure within the run-in string 14 the arm 13 may be swung laterally so as to cause the wall hook to pass adjacent the well walls even though these walls may have caved badly.

The finger 15 serves to engage the upper end of the fish and to cause it to enter the cylindrical body, it being understood that the lower end of the finger 15 is spaced from the bottom edge of the opposite side of the body to permit the fish F to pass therethrough. When the fish has been positioned within the body as illustrated in Fig. 8, an upward pull may be applied to the run-in string 14 which first tends to straighten the fish within the body. At the same time the slips will be engaged with the fish with the result that the movable slip 17 is caused to slide downwardly, inwardly, and forwardly with relation to the body so as to clampingly grip the fish and to effectively close the entrance to the body as is indicated in Fig. 7. The fish thus being thoroughly gripped and held against escape from within the body an upward strain may be taken on the run-in string of pipe and the fish recovered if it has not become immovably lodged in the well. In the event that it is impossible to move the fish and it is desired to release the tool from the fish in order to recover the tool this can be readily accomplished by lowering the run-in string of pipe 14 which enables the movable slip 17 to return to its normal position. The beveled surface 28 will thereafter be engaged by the top of the fish so as to cause the fish to be pushed out of the entrance to the wall hook. That is, it may assume a position somewhat as illustrated in Fig. 8. By reversely rotating pipe 14 a short distance the wall hook can thus be caused to completely disengage and release the fish and the tools and run-in string of pipe 14 can be recovered.

From the above-described construction it will be appreciated that an improved wall hook is provided wherein provision is made to effectively grip the fish within the body, closing the entrance to the body against the escape of the fish and in the event that the fish can not be loosened the wall hook can be readily released therefrom to permit of its recovery.

Various changes may be made in the details of construction without departing from the spirit and scope of the invention as defined by the appended claims, wherein—

I claim:

1. A wall hook comprising a semi-cylindrical body having a finger extending helically downward from one side thereof, a slip on the interior of the finger, and a second slip on the interior of the body arranged in opposition to the first-mentioned slip, one of said slips being movable on a downward path inclined toward the entrance to the body.

2. A wall hook comprising a semi-cylindrical body having a finger extending helically downward from one side thereof, a slip on the interior of the finger, and a second slip on the interior of the body arranged in opposition to the first-mentioned slip, said second slip being movable upon a downwardly, inwardly, and forwardly inclined path.

3. A wall hook comprising a semi-cylindrical body having a finger extending helically downward from one side thereof, a slip on the interior of the finger, a second slip on the interior of the body arranged in opposition to the first-mentioned slip, said second slip being movable upon a downwardly, inwardly, and forwardly inclined path, and means urging said second slip into its uppermost position.

4. A wall hook comprising a generally semi-cylindrical body having a finger extending helically downward from one side thereof, and means operable upon the application of an upward pull on the body relatively to a fish engaged thereby for closing the entrance to the body to less than a semi-circle, said body presenting an inclined surface at its top which is inclined forwardly over the finger.

5. A wall hook comprising a semi-cylindrical body having a finger extending helically downward from one side thereof, a slip on the interior of the finger, a second slip on the interior of the body arranged in opposition to the first-mentioned slip, said second slip being movable upon a downwardly, inwardly, and forwardly inclined path, and means urging said second slip into its uppermost position, said body presenting an inclined surface at its top which is inclined forwardly over the finger.

6. A device of the class described comprising a body of generally semi-cylindrical form having an open side, a finger extending helically downward from one side of the body partially across the open side thereof, means providing a downwardly, inwardly and forwardly inclined slip guide on the other side of said body adjacent the bottom thereof, and a slip movable on the slip guide for downward, inward and forward movement thereon toward the open side of the body whereby when a fish is engaged and the slip is forced downwardly thereby it will close the open side of the body to less than the diameter initially existing between the slip and the finger-carrying side of the body when the slip is in its uppermost position.

7. A device of the class described comprising a body of generally semi-cylindrical form having an open side, a finger extending helically downward from one side of the body partially across the open side thereof, means providing a downwardly, inwardly and forwardly inclined slip guide on the other side of said body adjacent the bottom thereof, a slip movable on the slip guide for downward, inward and forward movement thereon toward the open side of the body whereby when a fish is engaged and the slip is forced downwardly thereby it will close the open side of the body to less than the diameter initially existing between the slip and the finger-carrying side of the body when the slip is in its uppermost position, and spring means urging the slip into its uppermost position.

8. A device of the class described comprising a body of generally semi-cylindrical form having an open side, a finger extending helically downward from one side of the body partially across the open side thereof, means providing a downwardly, inwardly and forwardly inclined slip guide on the other side of said body adjacent the bottom thereof, a slip movable on the slip guide for downward, inward and forward movement thereon toward the open side of the body whereby when a fish is engaged and the slip is forced downwardly thereby it will close the open side of the body to less than the diameter initially existing between the slip and the finger-carrying side of the body when the slip is in its uppermost position, and a slip mounted on the interior of the body above the finger arranged diametrically opposite the mentioned slip when the mentioned slip is in its uppermost position.

CLARENCE P. YOUNG.

REFERENCES CITED

The following references are of record in the file of this patent:

UNITED STATES PATENTS

| Number | Name | Date |
|---|---|---|
| 1,511,061 | Nebergall | Oct. 7, 1924 |
| 1,587,971 | McClease | June 8, 1926 |
| 1,594,668 | Gates et al. | Aug. 3, 1926 |
| 1,776,027 | Hinderliter | Sept. 16, 1930 |
| 1,779,792 | Yungling | Oct. 28, 1930 |
| 2,109,493 | Lundeen | Mar. 1, 1938 |